June 20, 1933.    O. CZECZOWICZKA    1,914,848
MACHINE FOR SOWING SEEDS
Filed Nov. 2, 1929    4 Sheets-Sheet 1
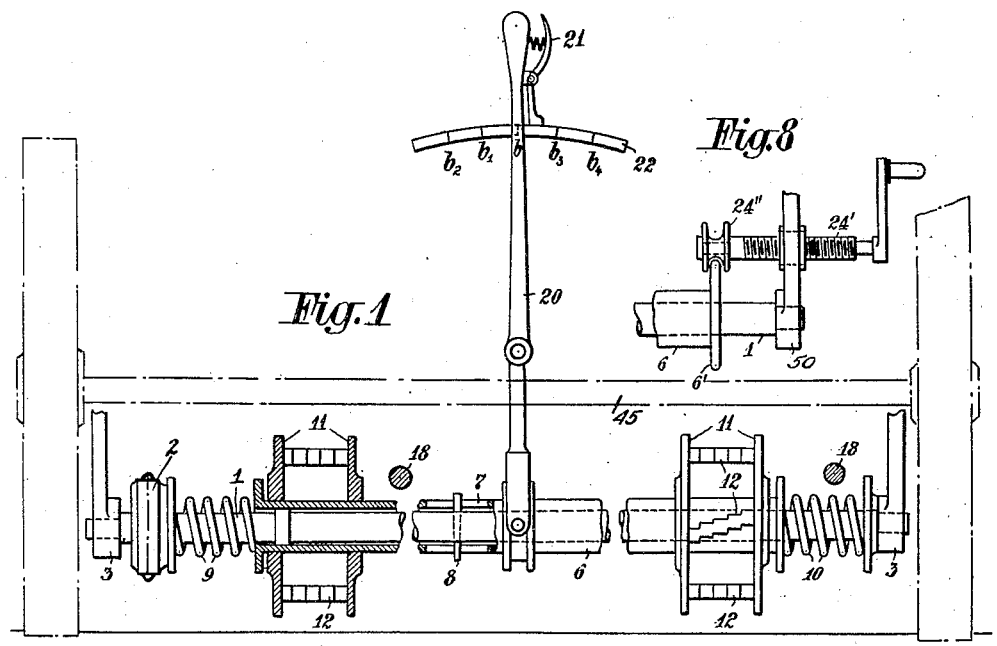
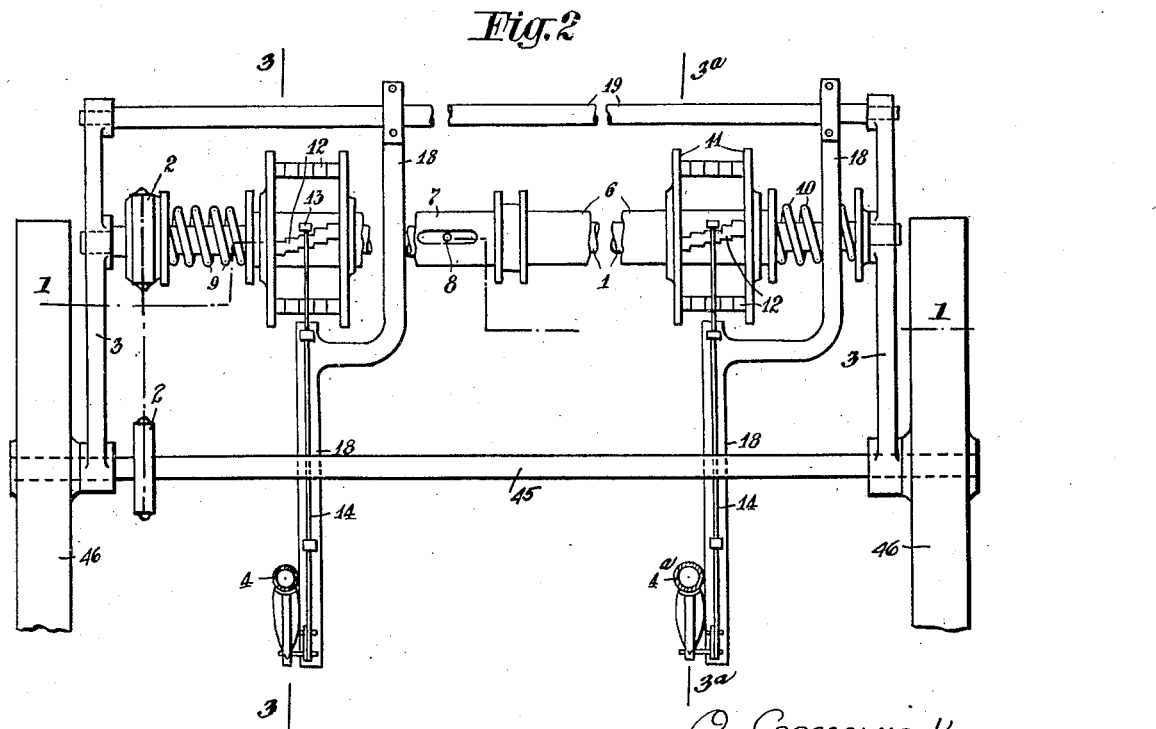

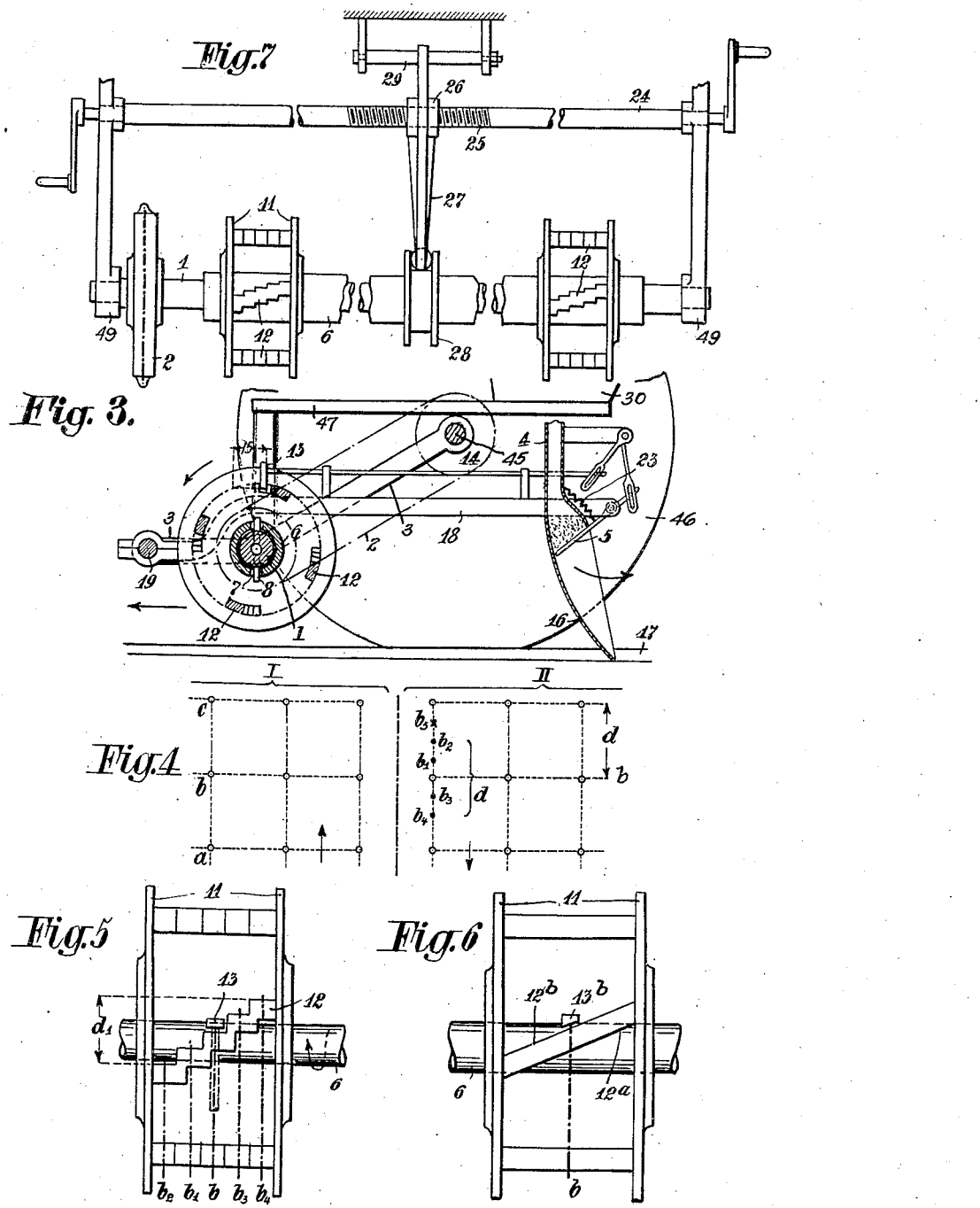

June 20, 1933.  O. CZECZOWICZKA  1,914,848
MACHINE FOR SOWING SEEDS
Filed Nov. 2, 1929  4 Sheets-Sheet 3

Inventor
O. Czeczowiczka
By
Atty.

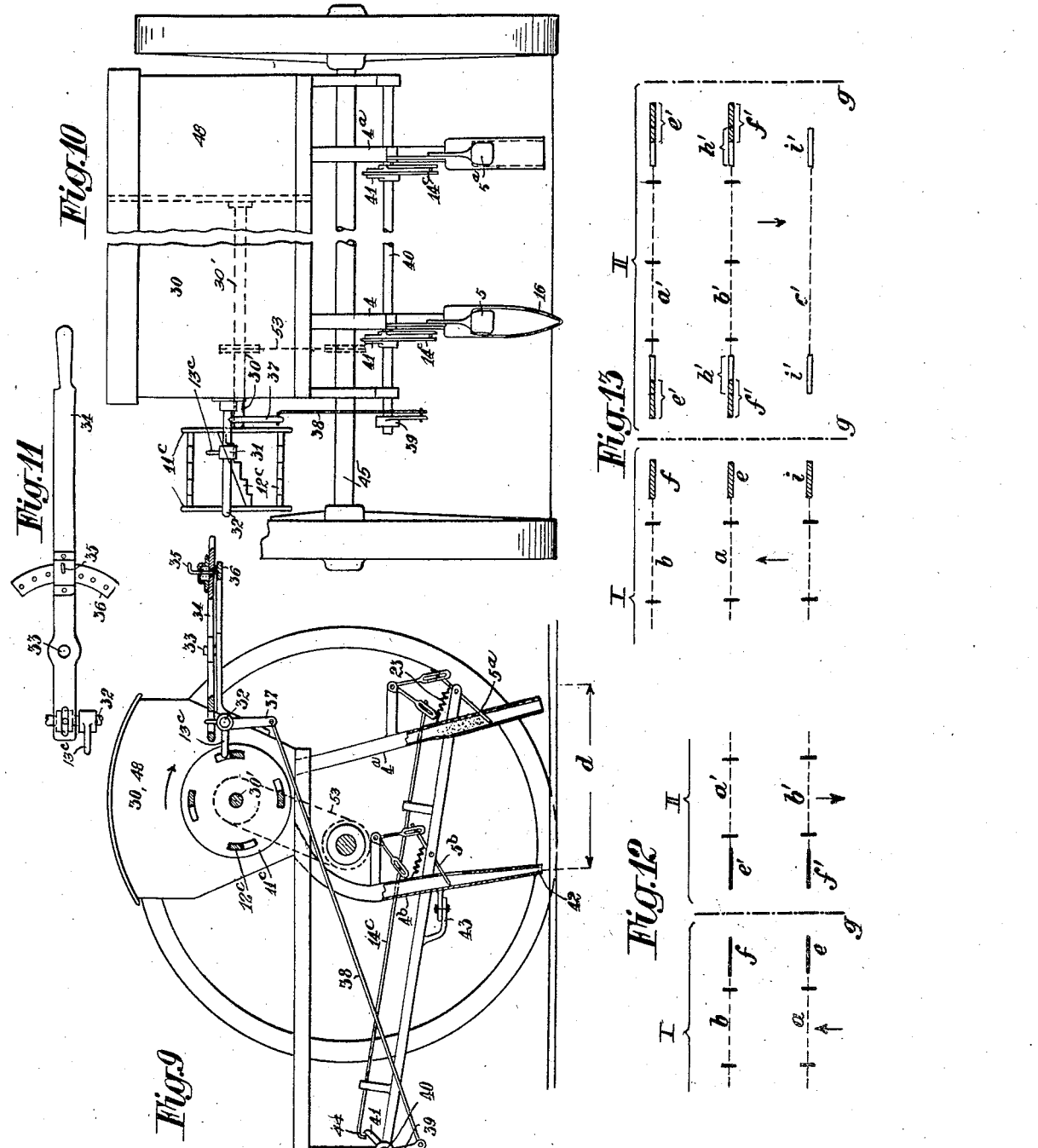

Patented June 20, 1933

1,914,848

UNITED STATES PATENT OFFICE

OSKAR CZECZOWICZKA, OF VIENNA, AUSTRIA

MACHINE FOR SOWING SEEDS

Application filed November 2, 1929, Serial No. 404,335, and in Germany November 16, 1928.

This invention relates to an appliance for sowing machines or drill ploughs for sowing or planting potatoes, turnips, cabbages, maize, carrots or the like, and the object of the invention is to provide for regulating the seed positions that form during interrupted sowing, which may be either drop-seedings or rows of grain sown successively at intervals by ridge drills, in continuous transverse rows, so that the transverse rows connected with one another from one machine breadth to the next form as nearly as possible unbroken lines, for the purpose of rendering possible not merely mechanical cutting in a longitudinal direction but also transversely to the field.

A further object of the invention is to provide sowers in which the laying of the seed positions is effected by opening seed valves in the seed duct by means of valve cams or tappets.

In such machines the device for moving the seed valves to regulate the seed positions in continuous transverse rows by means of revolving abutments is already known. In this way regulation is only possible when the machine is stationary.

It is also known to actuate, with the seed valves, the marking devices which work synchronously with them, and which place marks on the ground in order to facilitate inspection of the transverse rows.

As compared with these known devices the present invention comprises an appliance for sowing machines for regulating the seed positions in continuous transverse rows during travel, wherein the abutments are arranged in helical lines on the rotary shaft, and, in the case of a relative axial displacement or adjustment between them and the tappets actuated by them, the seed valves open earlier or later. The abutments may be formed by stepped or inclined strips or ledges. Such abutments may come into action for each seed valve separately, or for all seed valves of a sower together, in which latter case a transmission device to the individual seed valves is used.

The invention is illustrated by way of example in the accompanying drawings, in which Figure 1 is an irregular vertical section on the line 1—1 of Fig. 2; Figure 2 is a fragmentary plan view; Figure 3 is a vertical section on the line 3—3 of Fig. 2; Figure 3ª is a vertical section on the line 3ª—3ª of Fig. 2. One constructional example of the device for placing the dibble seed positions, in which the abutments act upon individual seed valves, and are axially displaceable for the purpose of regulating the seed positions, whereas the tappets actuated by them remain in position.

Figure 4 shows a diagram of the regulation of the transverse rows,

Figure 5 is a plan view of the abutment device,

Figure 6 is a plan view of a second form of abutment device having an inclined strip, and Figures 7 and 8, are fragmentary views similar to Fig. 1 showing two further examples of the construction of the device.

Figure 9 shows an example of the construction of the machine in vertical longitudinal section, and Figure 10 is rear elevation, in which the seed valves are collectively actuated by a central group of abutments by means of a transmission device.

Figure 11 shows a detail in top plan belonging to Figs. 9 and 10,

Figure 12 shows a diagram of the ground marks in the form of transverse lines, and Figure 13 a diagram of the ground marks with so-called advance marks.

Figure 3A:
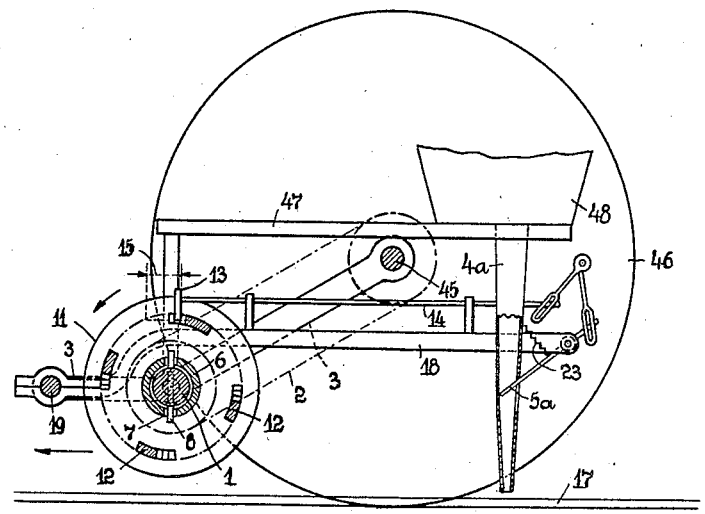

In Figures 1 to 3 and 3ª is shown a shaft 1, which extends parallel to the wheel axle 45 of the sower and is driven by it or by the wheels 46 by means of a chain drive 2, and which is supported on the frame 47 of the machine in arms 3, 3 for instance, and the purpose of which has hitherto been to actuate by means of tappets 13, the seed flap valves 5 which close the seed ducts 4.

One or two of these valves namely 5ª (Fig. 3ª) or some other means closes in a known manner, instead of a seed duct 4, a duct $4^a$ which leads to a vessel 48 containing calcareous grit or a liquid or the like, so that when this valve, or a cock opens, a clearly visible mark is produced on the ground by allowing a small quantity of the said material to fall, and this mark facilitates the regulating of the seed positions.

According to the drawings, the shaft 1 is coupled for rotation with a longitudinally slidable sleeve or hollow shaft 6 slipped over it, by means for example of longitudinal slots 7 in the sleeve and a transverse bolt 8, which passes through the shaft 1 and projects into the slots. Compression springs 9 and 10 arranged on both sides of the sleeve, tend to keep the sleeve in a central position. On the sleeve 6 are fixedly arranged at suitable distances from one another double discs 11, each pair of which carries between the discs one or more strips or ledges 12, four being a suitable number, which extend in helical lines relatively to the shaft 1, and have a stepped formation at least on their operative edge. Each step of this strip 12 forms an abutment, which, during its rotation, moves a tappet 13 on the rod 14 of the seed flap valve 5 (Fig. 3) and also a tappet 13 on the rod 14 of the marking valve $5^a$ (Fig. $3^a$) a certain distance 15 in the direction of the arrow, and thereby opens the valve 5 for the delivery of the seed accumulated upon it into a tusk-shaped chute 16, and through this chute into a furrow 17 in the ground and the valve $5^a$ for the delivery of the marking material on the ground. A spring 23 causes the closing movement of these valves. Each seed duct 4, together with the chute 16, the valve 5 and the rod 14, and also each duct $4^a$ together with the valve $5^a$ and the rod 14 is carried by an arm 18, which is secured to a rod 19, arranged in front of the driving shaft 1 and preferably supported like the latter in the same arms 3, 3, the arm 18 being for instance clamped to the rod 19, and then extended with an elbow bend in a rearward direction relatively to the machine, as shown in Figure 2. The sleeve 6, by means of a positioning lever 20 (Fig. 1), preferably arranged in the centre of its length, can be displaced to the left or right by overcoming the resistance of a spring 9 or 10, this movement shifting the strips 12. Instead of the abutments or strips 12, the tappets 13 actuated by them, may be axially displaceable or adjustable as will be hereinafter more fully described with reference to Figs. 9 and 10.

The apparatus operates in the following manner:—

When the device is acting normally, the sleeve 6 is located in a central position, which it tends to retain owing to the springs 9 and 10. Furthermore this central position is maintained by a sort of spring catch 21, which clamps the positioning lever to a stationary arc 22.

In this position of the parts the transverse rows $a$, $b$ and $c$, according to Figure 4 for example, are established in the width I when the machine is travelling in the direction of the arrow. When the machine begins a return run at the end of the field, the transverse rows of the width II are so established that they lie as nearly as possible in an unbroken continuation of the transverse rows of the width. If this concurrence is attained with the sleeve 6 in its existing position, the machine can go on working without being regulated. With this position of the sleeve, all tappets 13 occupy relatively to the stepped strips 12 a central position (Fig. 5), that is, the tappets are actuated by the central step for opening the valves 5 and $5^a$. This position, for instance, is denoted by $b$ and is in agreement with the transverse row $b$ of the width II (Fig. 4, on the right), which is to lie as nearly as possible in the direction of the transverse row $b$ of the width I. If, however, when the machine is reversed, it happens that the seeds of the transverse row $b$ under consideration are already located in the transverse row $b_1$, that is to say, too early, then steps may be taken by a suitable displacement of the sleeve 6 to make a corresponding correction. Since the transverse row is to be located later by the distance $b_1$ minus $b$, such a displacement of the sleeve 6 must be made that in Figure 5 the step $b_1$, which comes into action later, travels to $b$. This is effected by sliding the sleeve 6 towards the right by adjusting the positioning lever 20 to the mark $b_1$ on the arc 22, shown in Figure 1, in which position it is automatically firmly clamped by the spring catch 21, in order to prevent the sleeve from being returned by the more highly stressed spring 10. In the same manner the adjustment for a second point such as $b_2$ (Fig. 4) is effected according to the indication $b_2$ in Figures 5 and 1, and similarly for other points. If the transverse row were to be displaced to a position that was too late, for instance to $b_3$ or $b_4$ or further points, then an opposite displacement of the sleeve 6 is to be effected, in order that a step $b_3$ or $b_4$ (Fig. 5) that comes into action earlier may move into the plane of the valve tappet 13; see also the marks $b_3$ and $b_4$ in Figure 1.

If one end of the strips 12 is reached in the regulating, and a further displacement in the same direction is necessary, instead of effecting a displacement in the same direction the regulating can be effected from the opposite side, because a point $b_5$, for example, in Figure 4, corresponds to the point $b_3$; for since a point laid down too early for one transverse row is at the same time a point laid down too late for the preceding transverse row, the regulating can be carried out from both sides, that is, according to Figure 5, the regulating of the transverse rows may be effected by sliding the sleeve 6, together with the strips 12, either to the right or to the left, it being assumed that the regulating distance $d$ (Fig. 4) corresponds at least to the longitudinal distance $d$ between the transverse rows, to which dimension the reduced dimension $d_1$ in Figure 5 corresponds.

The machine works with the regulation once established as long as the transverse rows of seeds harmonize, and in such a way that in the case of the successively acting strips 12 revolving in unison with the running wheels, the same step always acts upon the valve tappet 13. If this agreement subsists until the reversal of the machine, the positioning lever 20 can then be released from its latched position, after which the springs 9 and 10 and the sleeve 6, together with the strips 12, return into the aforementioned mid position $b$ (Fig. 5), in order to make the apparatus ready for any renewed regulation which may become necessary in either direction.

Figure 6 shows a constructional form of the strips $12^a$, which, in place of the steplike operative edge, present a helical operative edge $12^b$. These strips render possible not merely single adjustments but as many adjustments relative to one another as may be desired throughout their entire length in relation to the tappets $13^b$, and therefore a finer regulation of the transverse rows. For these strips the tappets $13^b$ are preferably given an oblique acting surface (Fig. 6) better adapted to the inclination of the strips, being inclined for instance at the same angle.

The same strips $12^a$ may also be used for actuating the valve for the marking dust device, which accordingly lays down the ground marks synchronously in the transverse row of the seed positions.

In the constructional form of the invention illustrated in elevation in Figure 7, the automatic returning of the sleeve 6 into the mid position mentioned above, by the springs 9 and 10 of Figs. 1 to 3, is omitted. In this constructional form the sleeve 6, sliding on the shaft 1 and coupled therewith for rotation, is longitudinally displaceable in both directions without having to overcome the resistance of a spring. Furthermore the shifting of the sleeve 6 is here effected by means of a device which renders possible a finer adjustment. This device consists of a spindle 24, which is journalled in arms 49 of the machine frame parallel to the shaft 1, and which comprises in the centre a screw-thread 25, and is rotatable from both ends. A nut 26 meshing with this screw spindle forms an arm 27, which engages at one end with a collar 28 on the sleeve 6, and is prevented from rotating by a guide 29 mounted in the machine frame.

In this form of construction the adjustment of the sleeve 6 into the individual positions $b$ to $b_4$ already mentioned and shown in Figure 5, or into any desired positions, as shown in Fig. 6, is effected by rotating the screw-spindle 24 to the right or to the left, and in the same manner the sleeve 6 can be adjusted if desired into the mid position $b$ (Fig. 5) at the end of the field.

Figure 8 shows a constructional example of the device according to Figure 7. Here a short screw-spindle 24' is used, which meshes with a nut in the arm 50 carrying the shaft 1, and carries at the inner end a tappet member for the sleeve 6, for instance a rotatable double-flanged roller 24" for a flange 6' on the sleeve 6. By rotating the spindle 24' to right or left the sleeve 6 is shifted in one direction or the other. The spindle is fitted on that side of the machine on which the person in charge always accompanies it.

Figure 14:
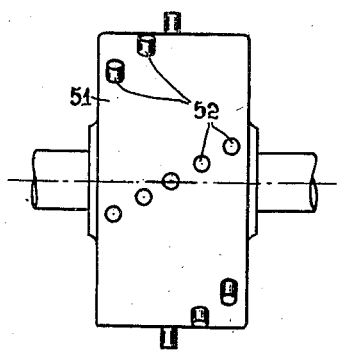
Fig. 14 is a detail elevation of a modified form of abutment member.

In the form of construction illustrated in Figures 9 and 10, a simplification of the machine is provided by the fact that the abutments are provided at only one point and co-operate with a single tappet, and actuate by means of a transmission device all the seed valves 5 and marking devices $5^a$ collectively. The abutments have again the form for instance of a double disc $11^c$, with a plurality of stepped strips $12^c$ extending in helical lines round the shaft 1. There may however alternatively, as shown in Fig. 14, be provided on the cylindrical surface of an ordinary drum 51 abutments in the form of pins 52 arranged helically.

This double disc $11^c$ is so arranged that it can be mounted upon the shaft 30' of the seed box 30 which is driven from the wheel axle by means of a chain 53. The seed box 30 in Fig. 10 extends over a large part of the width of the machine and a number of seed ducts 4 extend side by side from the seed box and are closed by valves 5. Only one seed duct 4 is shown in Fig. 10. The vessel 48 for receiving marking material is provided at the right end of the seed box 30 in Fig. 10; a duct $4^a$ (Figs. 9 and 10) extends therefrom and is closed by a valve $5^a$. The central tappet $13^c$ actuated by the strip steps is adjustable along the steps upon the shaft 32 which is mounted on the seed box 30. The central tappet $13^c$ is subject to the action of a hand lever 34, which is pivoted at 33 (Figs. 9 and 11), and which is held in adjusted position by a spring pin 35 dropping into notches in an arc 36 in the various positions, and can be adjusted by overcoming merely a slight force for the automatic disengagement of the pin.

The transmission device consists of an arm 37 upon the shaft 32, which arm exerts a rocking action by means of a rod 38 and an arm 39 upon a transverse shaft 40. This transverse shaft is provided with an arm 41 for the end 44 of each rod $14^c$ of a seed valve 5 and of the marking device $5^a$. When the strips $12^c$ revolve in the direction of the arrow all the valves 5 are opened at the same time and the regulating of the transverse rows, which are in line with one another from one width to the next, is effected in lines which are as nearly unbroken as possible, in the same manner as in Figures 4 and 5, by axial displacement of the central tappet $13^c$ by means of the lever 34.

The longitudinal displacement $d$ between the hills (Fig. 4) may be altered by exchanging the discs $11^c$ for other discs having a different number of strips $12^c$ as by changing of the transmission 53.

It is advisable to place the ground marks in lines transverse to the direction of travel instead of in points, in order to facilitate the subsequent regulation thereof in transverse rows. In Figure 12, for the width I, $a$, $b$ denote the transverse rows of seed positions, which are for instance short rows of grain sown by a ridge drill, and $e$, $f$ denote the ground marks corresponding to these transverse rows placed in lines transverse to the direction of travel, which is indicated by the arrow. Furthermore $g$ is the track of a running wheel, the tracks for the two widths I and II coinciding or else being close beside one another. $a'$ and $b'$ denote the seed positions, and $e'$ and $f'$ the transverse ground marks of the width II. For the purpose of laying the ground marks in transverse lines the outlet apertures for the marking material are made flat in shape.

In order to gain more time for regulating the seed positions in continuous transverse rows, and thereby to enable the regulating to be effected more easily and more accurately, ground marks are laid simultaneously for two transverse rows, one of which is located in the transverse row of the seed to be deposited at the same time, and the second of which is located in front of this transverse row, and belongs to the next transverse row of seeds to be laid. This is illustrated in Figure 13. This figure substantially agrees with Figure 12, only the following points should be observed. In traversing the machine in the width II in the direction indicated by the arrow, there are deposited at the same time the seeds of the transverse row $a'$, the ground mark $e'$ belonging to the transverse seed row $a'$ (on both sides of the machine for instance) and the ground mark $h'$ (advance mark) of the next following transverse row of seeds $b'$. When the next deposit occurs there are placed at the same time the seeds of the transverse row $b'$, the ground mark $f'$ belonging to this transverse row of seeds $b'$, and the ground mark $i'$ (advance mark) belonging to the next row of seeds $c'$ to be placed.

This simultaneous placing of the advance marks enable them to be sighted or gauged relatively to the ground mark or marks of the preceding width I, as will be clear from the marks $i'$ of the width II, which is to lie in a transverse direction with the mark $i$ of the width I. This sighting takes place even before the transverse row of seeds in question is deposited, and the man in charge, if $i'$ does not lie accurately in the transverse direction from $i$, still has enough time to effect the regulating by axial displacement of the strips $12^c$ for instance, so that if the seed and the second ground mark are subsequently placed in the transverse row $c'$ at the same time, these are placed, in consequence of the regulating, in correct alignment with the transverse row in question of the width I.

It will further be seen from Figure 13 that the actual ground mark, for instance $f'$, with correct positioning of the previously placed advance mark $h'$, is not placed, relatively to the opposite transverse row of the width I, exactly at the position of this advance mark $h'$, but laterally thereof, towards the wheel or towards the wheel track $g$, so that the two ground marks in the best case overlap one another to some extent laterally, or else, if regulating was necessary, are located one behind the other in the direction of travel of the machine.

For the placing of the advance marks, as will be seen from Figure 9, a duct $4^b$ for example, with a valve $5^b$ is used. This device is arranged on the machine in front of the actual mark-placing device, and is located at a distance $d$ therefrom, which corresponds to the distance between the transverse rows to be placed, in the direction of travel of the machine.

The duct $4^b$ is provided underneath with a flat outlet aperture 42 (Fig. 9), and above is connected with the same receptacle 48 (Fig. 10) as the duct $4^a$ which contains the marking material. In order to enable the distance $d$ to be altered, the mark-placing device $4^b$, $5^b$ may be so arranged at 43 as to be adjustable in the direction of travel of the machine. By these means the adjustment can be effected even transversely to the direction of travel. The valves $5^b$ are actuated in the same manner as the valves $5^a$, only they deposit the material on the ground in front of that from the valves $5^a$.

What I claim is:—

1. A device applicable to sowing machines for regulating seed positions in continuous transverse rows during the travel of the machine, comprising seed flap-valves, means working synchronously with said seed flap-valves for placing ground marks, a rotatable shaft, abutments arranged staggeredly on the rotatable shaft, and tappets cooperating with the abutments, rods connected to said tappets and adapted to actuate said seed flap-valves, rods connected to said tappets and adapted to actuate said ground marking means, said abutments and said tappets being relatively adjustable to alter the time of opening of said seed flap-valves and ground marking means.

2. A device applicable to sowing machines for regulating seed positions in continuous transverse rows during the travel of the machine, comprising seed flap-valves, means working synchronously with said seed flap-valves, for placing ground marks, a rotatable shaft, centrally arranged staggered abutments arranged about the rotatable shaft, a centrally arranged tappet cooperating with the abutments, rods adapted to actuate said seed valves, and rods adapted to actuate said ground marking means and transmission means for transmitting movements from said tappet to all said rods collectively, the abutments and tappet being relatively adjustable to alter the time of opening of said seed flap-valves and ground marking means.

3. A device applicable to sowing machines for regulating seed positions in continuous transverse rows during the travel of the machine, comprising seed flap-valves, means working synchronously with said seed flap-valves for placing ground marks, a rotatable shaft, centrally arranged staggered abutments arranged about the rotatable shaft, a centrally arranged tappet cooperating with the abutments, rods adapted to actuate said seed flap-valves, certain of said rods further adapted to actuate said ground marking means and transmission means for transmitting movements from said tappet to all said rods collectively, the abutments and tappet being relatively adjustable to alter the time of opening of said seed flap-valves and ground marking means.

4. A device applicable to sowing machines for regulating seed positions in continuous transverse rows during the travel of the machine, comprising seed flap-valves, means working synchronously with said seed flap-valves for placing ground marks, a rotatable shaft, centrally arranged staggered abutments arranged about the rotatable shaft, a centrally arranged tappet cooperating with the abutments, rods adapted to actuate said seed valves, and rods adapted to actuate said ground marking means and transmission means for transmitting movements from said tappet to all said rods collectively, said tappet being axially adjustable to alter the time of opening of said seed flap-valves and ground marking means.

5. A device applicable to sowing machines for regulating seed positions in continuous transverse rows during the travel of the machine, comprising seed flap-valves, means working synchronously with said seed flap-valves for placing ground marks, a rotatable shaft, centrally arranged staggered abutments arranged about the rotatable shaft, a centrally arranged tappet cooperating with the abutments, rods adapted to actuate said seed flap-valve and certain of said rods further being adapted to actuate said ground marking means and transmission means for transmitting movement from said tappet to all said rods collectively, said tappet being axially adjustable to alter the time of opening of said seed flap-valves and ground marking means.

6. A device applicable to sowing machines for regulating seed positions in continuous transverse rows during the travel of the machine, comprising seed flap-valves, means working synchronously with said seed flap-valves for placing ground marks, a rotatable shaft, centrally arranged staggered abutments arranged about the rotatable shaft, a central rocking tappet arranged on a shaft and cooperating with the abutments, rods adapted to actuate said seed flap-valves, and rods adapted to actuate said ground marking means and transmission means for transmitting movements from said tappet to all said rods collectively, said tappet being axially adjustable on its shaft to alter the time of opening of said seed flap-valves and ground marking means.

7. A device applicable to sowing machines for regulating seed positions in continuous transverse rows during the travel of the machine, comprising seed flap-valves, means working synchronously with said seed flap-valves for placing ground marks, a rotatable shaft, centrally arranged staggered abutments arranged about the rotatable shaft, a central rocking tappet arranged on a shaft and cooperating with the abutments, rods adapted to actuate said seed flap-valves and certain of said rods further being adapted to actuate said ground marking means and transmission means for transmitting movements from said tappet to all said rods collectively, said tappet being axially adjustable on its shaft to alter the time of opening of said seed flap-valves and ground marking means.

8. A device applicable to sowing machines for regulating seed positions in continuous transverse rows during the travel of the machine, comprising seed flap-valves, means working synchronously with said seed flap-valves for placing ground marks, a rotatable shaft, centrally arranged staggered abutments arranged about the rotatable shaft, a central rocking tappet arranged on a shaft and cooperating with the abutments, rods adapted to actuate said seed and rods adapted to actuate said ground marking means and transmission means for transmitting movements from said tappet to all said rods collectively, said transmission means including a rocking shaft and members thereon being adapted to actuate all said rods simultaneously, said tappet being axially adjustable on its shaft to alter the time of opening of said seed flap-valves and ground marking means.

9. A device applicable to sowing machines for regulating seed positions in continuous transverse rows during the travel of the machine, comprising seed flap-valves, means working synchronously with said seed flap-valves for placing ground marks, a rotatable shaft, centrally arranged helical abutments arranged about the rotatable shaft, a central rocking tappet arranged on a shaft and cooperating with the abutments, rods adapted to actuate said seed flap-valves and certain of said rods further adapted to actuate said ground marking means and transmission means for transmitting movements from said tappet to all said rods collectively, said transmission means including a rocking shaft and members thereon adapted to actuate all said rods simultaneously, said tappet being axially adjustable on its shaft to alter the time of opening of said seed flap-valves and ground marking means.

10. A device as claimed in claim 1, characterized in that said abutments are in the form of stepped strips arranged helically on the rotatable shaft.

11. A device as claimed in claim 2, characterized in that said shaft constitutes the seed box shaft.

12. A device as claimed in claim 1, characterized by the provision of means for simultaneously placing ground marks for one transverse row of seeds and producing advance ground marks for the next following transverse row of seeds.

In witness whereof I have hereunto signed my name.

OSKAR CZECZOWICZKA.